United States Patent [19]

Matsuura et al.

[11] Patent Number: 5,291,589
[45] Date of Patent: Mar. 1, 1994

[54] SYSTEM FOR CONTROLLING RESTORATION FROM FAILURE IN QUEUE STRUCTURE OF CONTROL DATA

[75] Inventors: Hidekazu Matsuura, Yokohama; Yukiyoshi Ohmura, Kawasaki, all of Japan

[73] Assignee: Fujitsu Limited, Kawasaki, Japan

[21] Appl. No.: 683,041

[22] Filed: Apr. 10, 1991

[30] Foreign Application Priority Data

Apr. 11, 1990 [JP] Japan .................................. 2-095370

[51] Int. Cl.⁵ ............................................. G06F 11/00
[52] U.S. Cl. ..................................... 395/575; 395/650
[58] Field of Search ................................ 395/575, 650

[56] References Cited

U.S. PATENT DOCUMENTS

| | | | |
|---|---|---|---|
| 4,314,329 | 2/1982 | Crewe et al. ........................ | 395/575 |
| 4,459,658 | 7/1984 | Gabbe et al. ........................ | 364/200 |
| 4,615,001 | 9/1986 | Hudgins, Jr. ........................ | 364/200 |

FOREIGN PATENT DOCUMENTS 0272821  6/1986  European Pat. Off. .

Primary Examiner—Charles E. Atkinson
Attorney, Agent, or Firm—Staas & Halsey

[57] ABSTRACT

A system for controlling a process of restoration from a failure in a queue structure of control data used in computer equipment. The system includes an identifier table having identifiers for indicating the contents of control data and individual pointers with respect to the control data, a queue restoration processing unit for restoring a control data queue based on queue pointers when the content of the control data is destroyed by a failure, a control data normality deciding unit for separating correct control data from abnormal control data based on the identifier table, and a control data restoration processing unit for re-connecting normal control data which is not connected in a queue structure, into a queue structure.

5 Claims, 8 Drawing Sheets

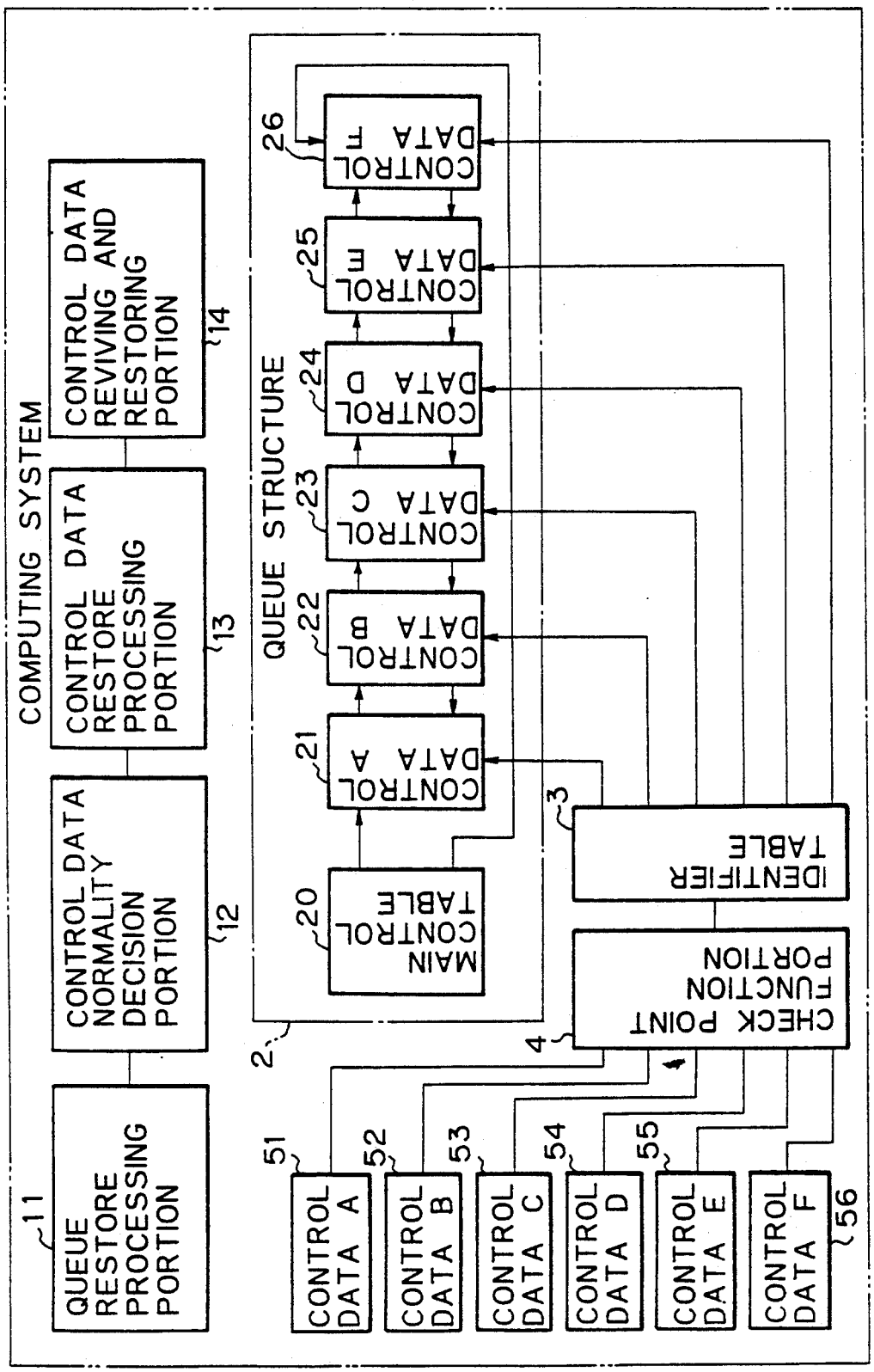

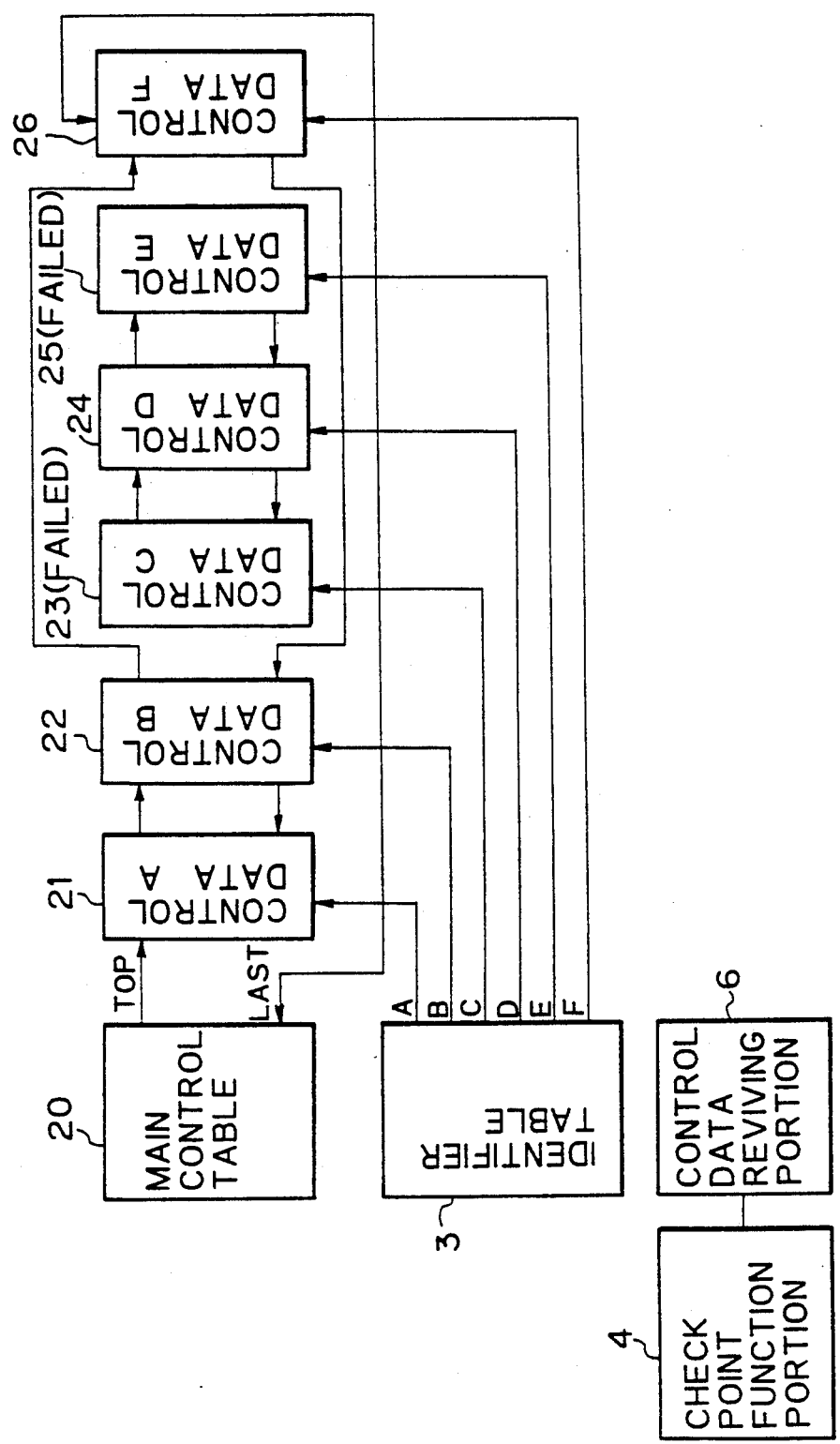

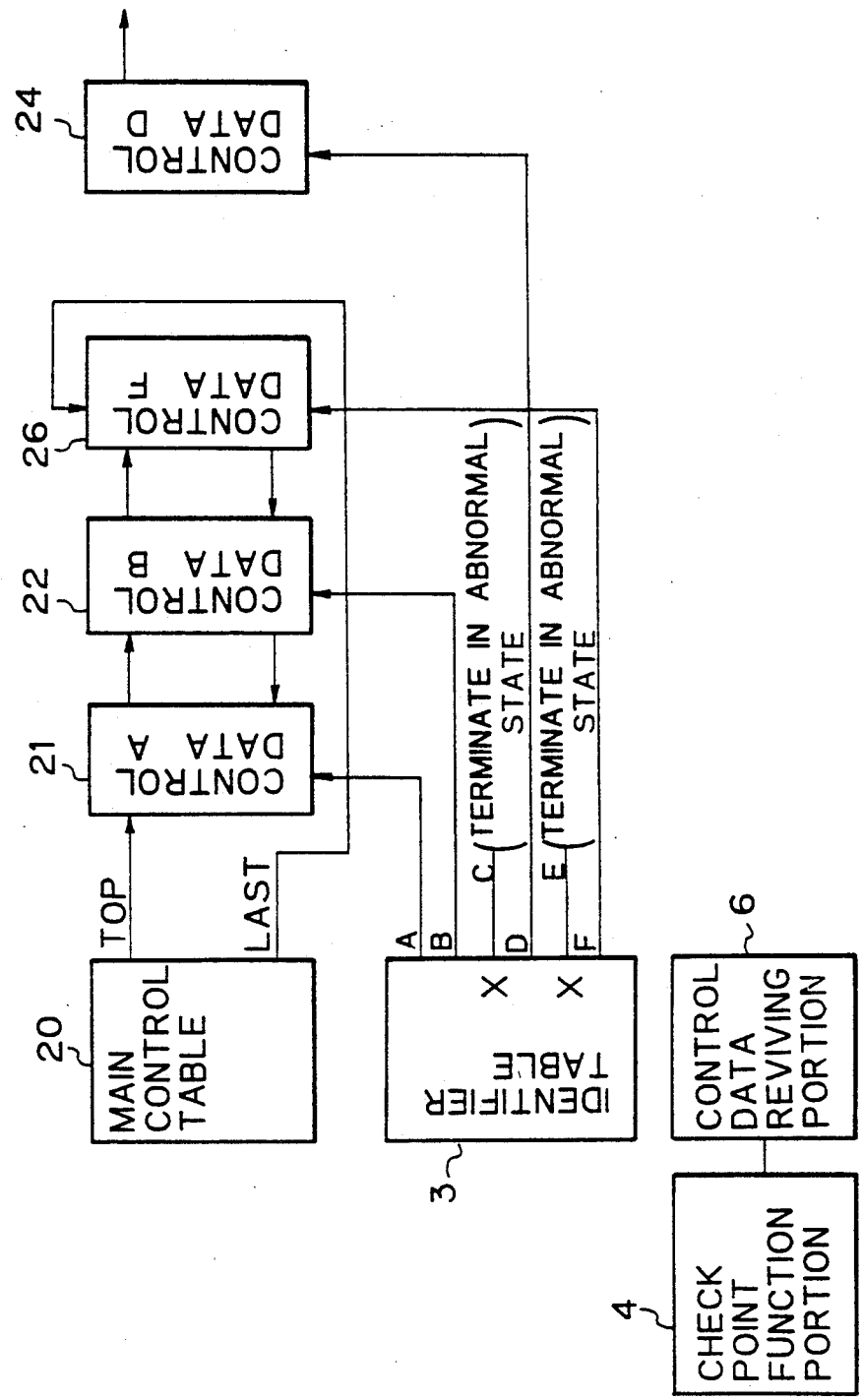

SYSTEM FOR CONTROLLING RESTORATION FROM FAILURE IN QUEUE STRUCTURE OF CONTROL DATA

BACKGROUND OF THE INVENTION

1. Field of the Invention

The present invention relates to a system for controlling a process of restoration from a failure of control data used in computer equipment and provided in a queue structure. The computer equipment which controls a control data group having a queue structure connected by pointers. The system according to the present invention can be used for restoring the queue structure of control data when a failure occurs in the queue structure.

2. Description of the Related Art

A queue is one of the structural data types for control data for computer programs. The queue type data structure is used to provide a sequence of operations arranged to form a data queue. In operation of the queue type data structure, different kinds of operations are provided, for example NEW, FRONT, DELETE, ADD, ISNEW, etc.

In general, in the handling of control data, identifiers are provided in the control data, the control data are chained by forward and backward pointers, and the first group of control data and the last group of control data are connected by pointers to a main control table.

In the prior art, when a failure occurs in the control data in a queue structure and the queue structure is resultingly destroyed, the control data queue is inspected along the forward direction represented by a sequence of the forward queue pointers, as well as along the backward direction represented by a sequence of the backward queue pointers to detect the location of the failure. Based on the detection of the failure, connections of the control data are changed. By changing the connections, the control data are connected by forward queue pointers and backward queue pointers, and accordingly the queue structure is restored at least for the time being. In the conventional restoration process, however there is a problem that, the inspection of the queue pointer is interrupted at the time when the failed control data is found, and accordingly it happens that the control data which has not failed, i.e., the normal control data which neighbors the failed control data, is excluded from the queue structure causing the excluded control data to be lost.

Also in the conventional restoration process, there is a problem that a control data identifier is provided in the control data, and therefore, once the identifier itself is destroyed, it becomes impossible to identify the failed control data.

SUMMARY OF THE INVENTION

It is an object of the present invention to provide an improved system for controlling a restoration from a failure in a queue structure (control queue) of control data in which the restoration of the control data from a failure can be carried out satisfactorily even if a number of control data groups in the queue structure are destroyed by the failure.

According to the present invention there is provided a system for controlling a restoration from a failure in a queue structure of control data used in computer equipment. This system includes: an identifier table having identifiers for indicating the contents of control data and individual pointers with respect to the control data. A queue restoration processing unit for restoring a control data queue based on queue pointers when the content of the control data is destroyed by a failure. A control data normality deciding unit is also provided for separating correct control data from abnormal control data based on the identifier table. Finally, a control data restoration processing unit is provided for re-connecting normal control data which is not connected in a queue structure, into a queue structure.

BRIEF DESCRIPTION OF THE DRAWINGS

FIG. 2 is a schematic diagram of the system according to an embodiment of the present invention;

FIGS. 3A to 3E illustrate an example of processes of operation of the system according to an embodiment of the present invention.

DESCRIPTION OF THE PREFERRED EMBODIMENTS

Before describing the preferred embodiments, an example of a queue structure to which the system according to the present invention is applicable is described with reference to FIG. 1. As one type of data structure, a queue structure has been used. The queue structure is sometimes used for realizing the operation of a virtual machine in a virtual computing machine system.

Figure 1:
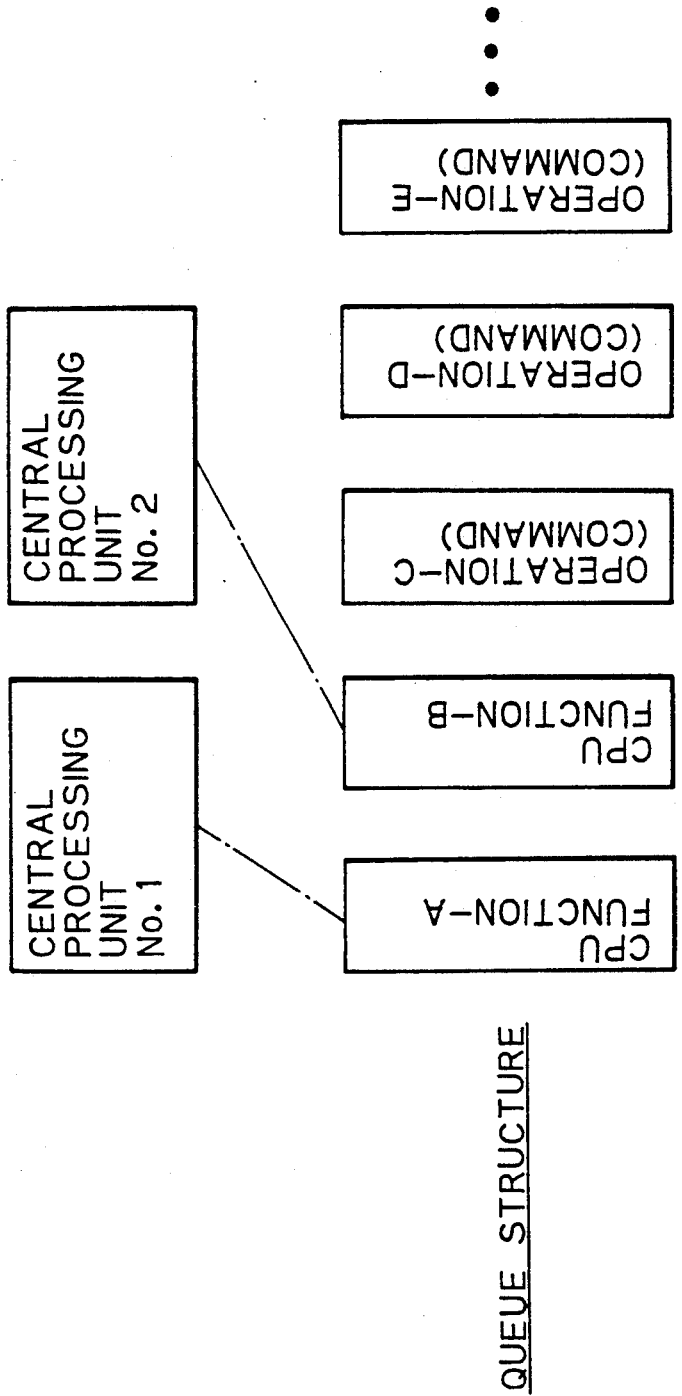
FIG. 1 illustrates an example of a queue structure to which the system according to the present invention is applicable.

In an example shown in FIG. 1, CPU function-A, CPU function-B, operation-C (a command), operation-D (a command), operation-E (a command), and so on are arranged in sequence in connection with central processing unit (CPU) No. 1 and central processing unit No. 2. CPU function-A is associated with CPU No. 1, and CPU function-B is associated with CPU No. 2.

In general, the priority order of the processes in the queue structure is changed at random in accordance with the operating state of the virtual machine, the commands, and the like. In some cases, with the use of a plurality of CPU's, a function can be carried out only by a predetermined specific CPU, and accordingly a sequence of the control data is not always processed from the beginning of the queue structure of the control data. Therefore, it is important that it be possible for the queue structure to take in or take out control data at high speed regardless of the position of the control data in the queue structure, and that reliable forward and backward directional pointers be provided in the queue structure.

A computing system for controlling a restoration from a failure in a queue structure of control data used in computer equipment according to an embodiment of the present invention is shown in FIG. 2.

The system of FIG. 2 includes a queue restoration processing portion 11, a control data normality decision portion 12, a control data restoration processing portion 13, and a control data reviving and restoring portion 14. The system of FIG. 2 also includes a queue structure 2 having a main control table 20, and a sequence of control data 21 to 26. The system of FIG. 2 further includes an identifier table 3, a check point function portion 4, and a plurality of control data 51 to 56.

The identifier table 3 controls the identifiers for the control data 21 to 26 and the pointers, represented by arrow symbols, for the control data. The control data 21 to 26 are chained by forward and backward directional pointers. The main control table 20 has a pointer to the first control data 21 and a pointer to the last control data 26.

The identifier table 3 has identifiers for indicating the content of each of the control data 21 to 26, and individual pointers for the control data 21 to 26.

In the queue restoration processing portion 11, when the content of a control data is destroyed by a failure, the restoration of the queue structure 2 of the control data is carried out within the scope where the restoration is possible based on the forward directional pointers and the backward directional pointers. In the control data normality decision portion 12, whether a control data to be checked is normal or not is decided based on the identifier table 3, and, according to the result of the decision, the normal control data and the failed control data, i.e., the abnormal control data, are separated. In the control data restoration processing portion 13, normal control data which are not connected in the queue structure are re-connected in the queue structure according to the result of the decision by the control data normality decision portion 12. In the control data reviving and restoring portion 14, the failed control data is handled by using the function of the check point function portion 4 to revive the normal control data, and the restoration of the control data in the queue structure is carried out.

An example of processes of operation of the system shown in FIG. 2 will now be explained with reference to FIGS. 3A to 3E.

Figure 3A:
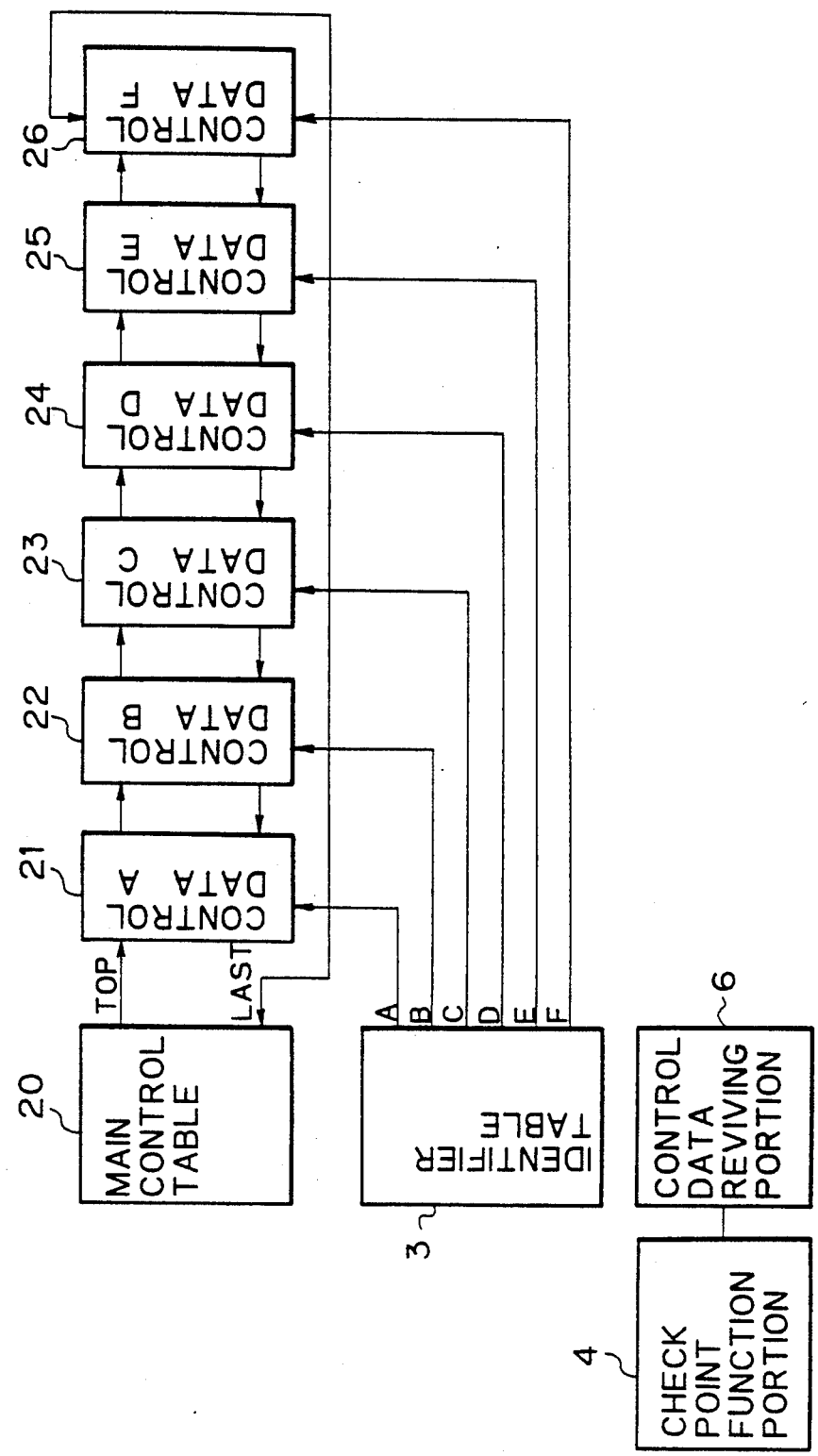

In the state shown in FIG. 3A, a sequence of control data 21, 22, 23, 24, 25, and 26 corresponding to identifiers A, B, C, D, E, and F is connected to the queue terminals of the main control table 20. Each of the control data 21 to 26 is a process control block (PCB) which is provided for each operation process in order to control the process, and is related to a process identifier (process ID) for identifying the operation process.

As examples of a queue structure, there are a ready queue structure in control data for processes which in a state wherein execution is possible are connected, a wait queue structure in which control data for processes which are in a state wherein events are being awaited, and the like.

The identifier table 3 has identifiers A to F for process identification, and pointers which are directed to the corresponding control data.

In the state shown in FIG. 3A, it is assumed that the contents of the control data 23 having identifier C and the control data 25 having identifier E are destroyed by failure. Due to the destruction of the contents of the control data 23 and 25, the chain connections of the queue structure are cut between the control data 22 and 23 (identifiers B and C) and between the control data 25 and 26 (identifiers E and F). The state shown in FIG. 3A is then changed to the state shown in FIG. 3B. By checking the queue structure by using a sequence of pointers starting from the top pointer of the main control table 20, and a sequence of pointers starting from the last pointer of the main control table 20, it is detected that only control data A, B, and F are normal, i.e., have not failed. Based on this detection, the queue structure of a sequence of control data 21, 22, and 26 for identifiers A, B, and F is restored, as shown in FIG. 3B.

In this case, it is decided that the control data 24 for identifier D has not failed and the control data 23 and 25 for identifiers C and E have failed. Based on this decision, control data 23 and 25 for identifiers C and E are terminated in the abnormal state in the identifier table 3, as shown in FIG. 3C.

Figure 3D:
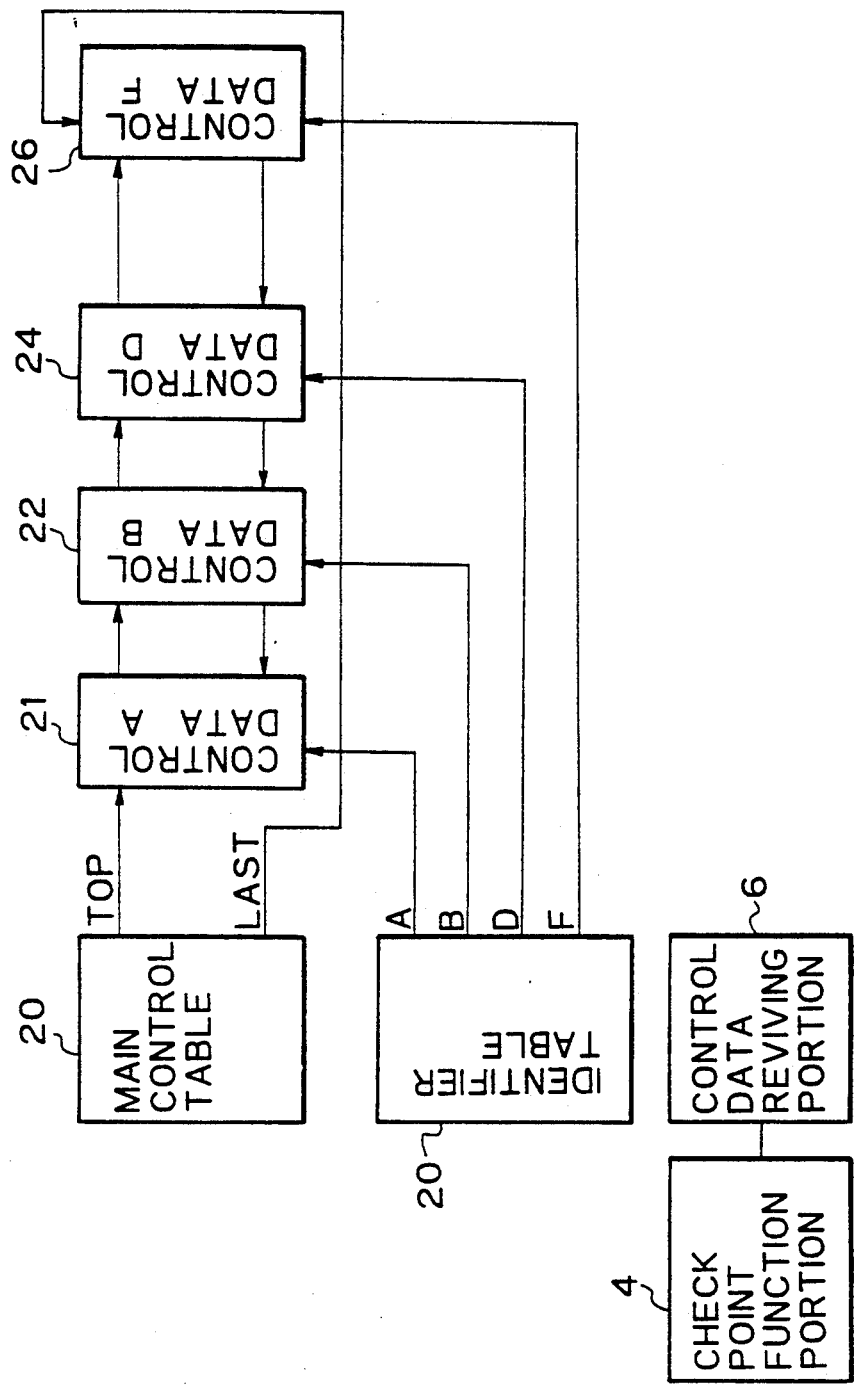

Based on the determination that control data 24 for identifier D has not failed, control data 24 for identifier D is returned to the queue structure to restore the queue structure for control data 21, 22, 24, and 26 for identifiers A, B, D, and F, as shown in FIG. 3D.

Figure 3E:
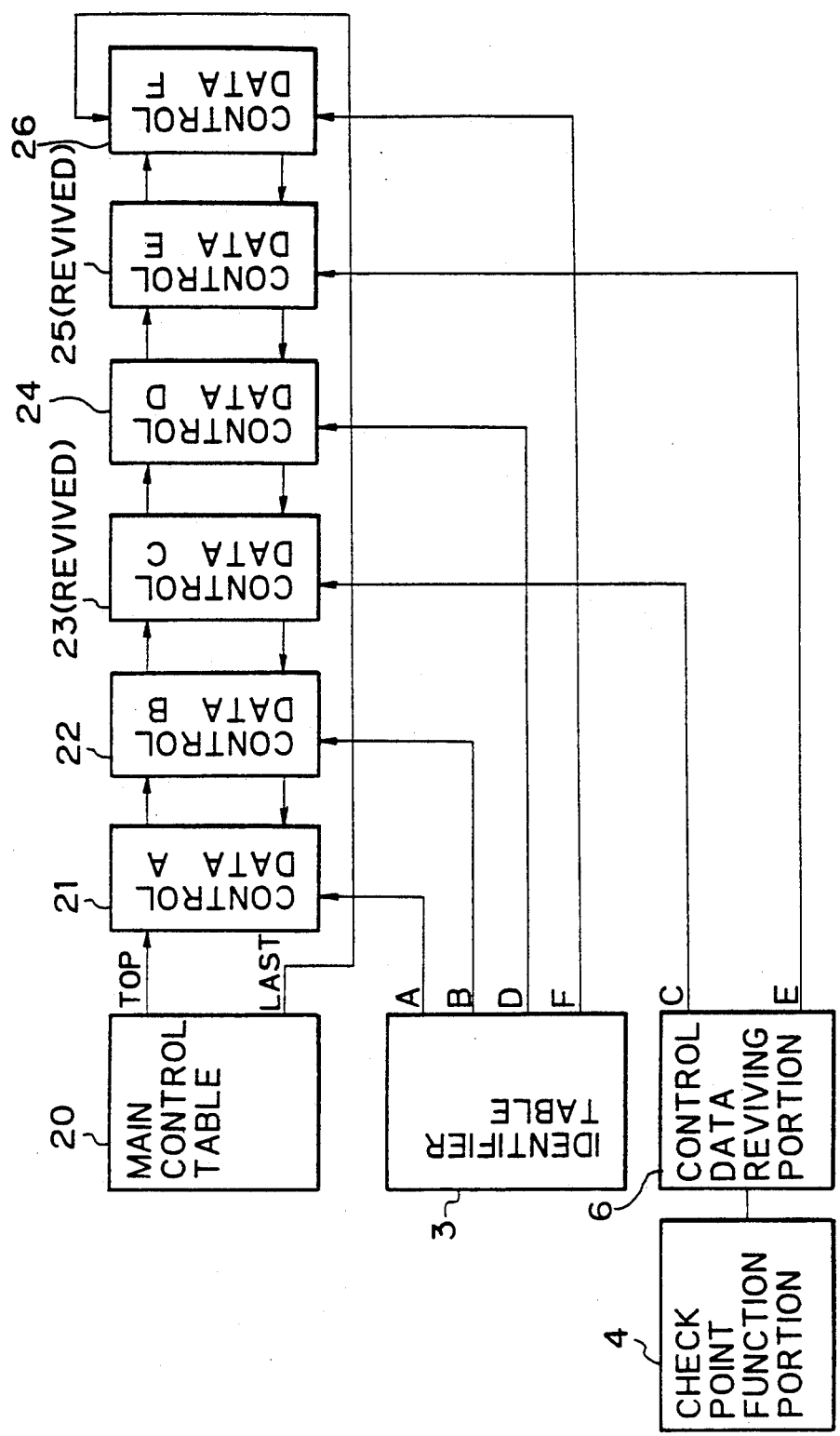

By the operation of the check point function portion 4 and the control data reviving portion 6, control data 23 and 25 for identifiers C and E are revived, and the revived control data 23 and 25 are taken into the queue structure to restore the queue structure for control data 21, 22, 23, 24, 25, and 26 for identifiers A, B, C, D, E, and F, as shown in FIG. 3E.

Figure 4:
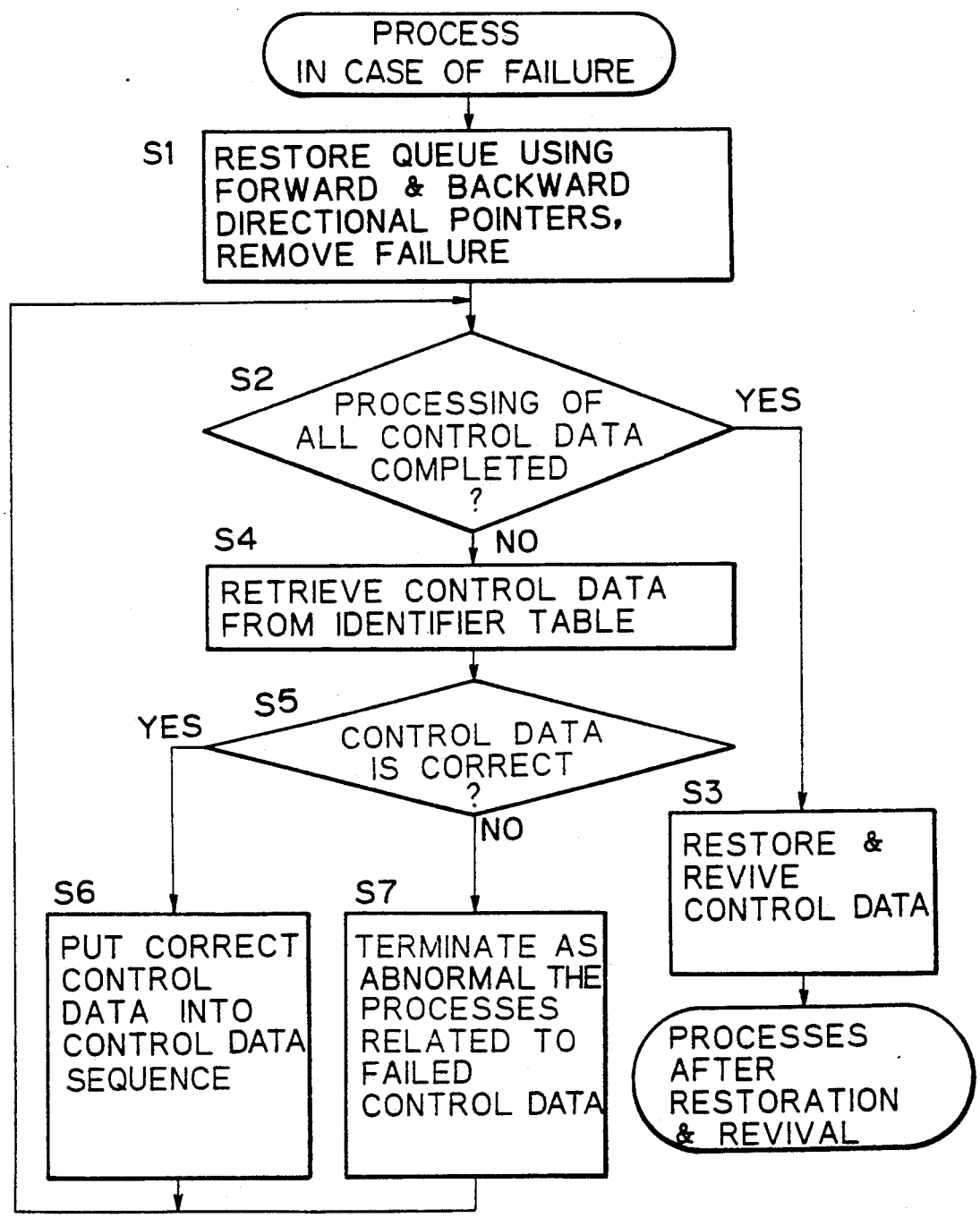
FIG. 4 shows an example of the flow chart of the operation of the system according to an embodiment of the present invention.

An example of the flow of the operation of the system of FIG. 2 in the case of failure of control data is shown in the flow chart of FIG. 4.

When the occurrence of a failure is detected as a result of a machine check, a program check, or the like, the failed control data is removed and the queue structure is restored using the forward and backward directional pointers (step S1).

It is then decided whether or not the processing of all the control data registered in the identifier is completed (step S2).

When the decision in step S2 is YES, the process proceeds to step S3 to restore the control data and revive the control data (step S3). The processes after the restoration and the revival are then carried out.

When the decision in step S2 is NO, the process proceeds to step S4 to retrieve the control data from the identifier table (step S4).

It is then decided whether or not the retrieved control data is correct (step S5).

When the decision is YES, the process proceeds to step S6 to put the correct control data into the control data sequence to restore the queue structure (step S6). Then, the process goes back to step S2 to repeat the process for the next control data.

When the decision is NO, the process proceeds to step S7 to terminate in the abnormal state the processing related to the failed control data (step S7). The process then goes back to step S2 to repeat the process for the next control data.

We claim:

1. A system for controlling a process of restoration from a failure in a queue structure of control data used in a computer, said system comprising:

an identifier table of the computer having identifiers for indicating the contents of the control data and individual pointers with respect to the control data;

queue restoration process means of the computer for restoring a control data queue based on queue pointers when the content of the control data is destroyed by a failure by disconnecting and connecting the queue pointers;

control data normality deciding process means of the computer for separating normal control data from abnormal control data based on the identifier table; and control data restoration process means of the computer for re-connecting into the queue structure normal control data disconnected from the queue structure by said queue restoration process means.

2. A system according to claim 1, further comprising control data reviving and restoring process means of the computer for reviving control data corresponding to the failed control data by a check-point function, and putting the revived control data into the control data sequence to restore the queue structure.

3. A control queue restoration system for controlling restoration of a failure in a control queue, said system comprising:
   storage means for storing contents of control data within the control queue and pointers to the control data within the control queue;
   a computer coupled to said storage means and comprising:
   disconnection process means of said computer for disconnecting failed control data by disconnecting control data including the failed control data from the control queue; and
   restoration process means of said computer for determining normal control data and restoring the normal control data that has been disconnected from the control queue by said disconnection process means, in accordance with the pointers to the control data stored by said storage means and contents of the control data stored by said storage means.

4. A control queue restoration system according to claim 3, wherein said computer further comprises queue restoration process means for restoring the failed control data and returning the failed control data to the control queue.

5. A method of restoring a failure of control data into a control queue for a computer, comprising the steps of:
   (a) storing contents of the control data and pointers to the control data;
   (b) determining failed control data destroyed by a failure;
   (c) disconnecting the failed control data by changing queue pointers;
   (d) determining normal control data based on the contents and pointers stored in step (a); and
   (e) reconnecting into the control queue the normal control data determined in step (d) that has been disconnected in step (c).

* * * * *

UNITED STATES PATENT AND TRADEMARK OFFICE
CERTIFICATE OF CORRECTION

PATENT NO. : 5,291,589
DATED : March 1, 1994
INVENTOR(S) : Hidekazu MATSUURA et al.

It is certified that error appears in the above-indentified patent and that said Letters Patent is hereby corrected as shown below:

Column 1, line 60, delete "from a";

line 61, delete "failure".

Column 2, line 2, after "unit" insert --is provided--.

Column 3, line 46, delete "which".

Signed and Sealed this

Tenth Day of January, 1995

Attest:

BRUCE LEHMAN

Attesting Officer    Commissioner of Patents and Trademarks